United States Patent [19]
Deschatrettes et al.

[11] Patent Number: 5,797,799
[45] Date of Patent: Aug. 25, 1998

[54] SLIDING UNIVERSAL JOINT FOR A MOTOR VEHICLE HAVING A TRIPOD WITH THREE JOURNALS EACH HAVING TWO DIFFERENT FORCE TRANSMISSION COMPONENTS

[75] Inventors: Gérard Deschatrettes, Montesson; François Verbrugge, Cergy St Christophe, both of France

[73] Assignee: GKN Automotive AG, Lohmar, Germany

[21] Appl. No.: 584,202

[22] Filed: Jan. 11, 1996

[30] Foreign Application Priority Data

Jan. 11, 1995 [FR] France ................... 95 00275

[51] Int. Cl.⁶ ............................................. F16D 3/26
[52] U.S. Cl. ........................ 464/111; 464/167; 464/905
[58] Field of Search .......................... 464/111, 905, 464/122, 120, 167

[56] References Cited

U.S. PATENT DOCUMENTS

| | | | |
|---|---|---|---|
| 2,559,108 | 7/1951 | Boge, Sr. et al. | 64/8 |
| 2,898,749 | 10/1959 | Parkman | 64/8 |
| 3,381,497 | 5/1968 | Allen | 64/7 |
| 3,478,538 | 3/1968 | Heimler | 101/407 |
| 4,291,552 | 9/1981 | Orain | 64/21 |
| 4,582,501 | 4/1986 | Gibbons | 464/85 |
| 4,582,502 | 4/1986 | Girguis | 464/111 |
| 4,741,723 | 5/1988 | Orain | 464/167 X |
| 4,828,534 | 5/1989 | Orain | 464/111 |
| 4,878,881 | 11/1989 | Van Dest | 464/111 |
| 4,881,923 | 11/1989 | Orain | 464/111 |
| 4,954,120 | 9/1990 | Kobayashi | 464/141 |
| 4,988,327 | 1/1991 | Orain | 464/905 X |
| 5,019,016 | 5/1991 | Uchman | 464/111 |
| 5,030,168 | 7/1991 | Orain | 464/905 X |
| 5,061,223 | 10/1991 | Kadota et al. | 464/111 |
| 5,135,438 | 8/1992 | Poulin et al. | 464/111 |
| 5,184,978 | 2/1993 | Fillmore et al. | 464/167 X |
| 5,254,038 | 10/1993 | Schneider | 464/111 |
| 5,290,202 | 3/1994 | Orain | 464/111 |

FOREIGN PATENT DOCUMENTS

| | | |
|---|---|---|
| 0 206 886 | 6/1986 | European Pat. Off. . |
| 0 429 326 A1 | 10/1990 | European Pat. Off. . |
| 0 477 074 A1 | 9/1991 | European Pat. Off. . |
| 1 012 081 | 6/1949 | France . |
| 2 506 872 | 6/1981 | France . |
| 2 592 106 | 12/1986 | France . |
| 2 622 653 | 10/1987 | France . |
| 2 628 803 | 3/1988 | France . |
| 23 31 033 | 1/1975 | Germany . |
| 44 10 724 A1 | 3/1994 | Germany . |
| 61-266830 | 11/1986 | Japan . |
| 63-92822 | 4/1988 | Japan . |
| 3-168416 | 7/1991 | Japan . |
| 5-321942 | 12/1993 | Japan . |
| 2 106 219 | 6/1982 | United Kingdom . |
| 2 210 952 | 6/1989 | United Kingdom . |
| WO91/16549 | 10/1991 | WIPO . |

*Primary Examiner*—Donald P. Walsh
*Assistant Examiner*—Emmanuel M. Marcelo
*Attorney, Agent, or Firm*—Wenderoth, Lind & Ponack, L.L.P.

[57] ABSTRACT

A sliding universal joint comprises a male element (1) intended to be fixed to a first shaft and including arms (6). Each arm bears a ball-type journal (7) which is integral therewith. A female element (20 intended to be fixed to a second shaft defines two guide paths which are situated on either side of each journal. Intermediate member (3, 4) are interposed between each journal and the associated guide paths. These intermediate members comprise a first member (3) which interacts with a first path (8) of the guide paths and has properties, with respect to the transmission and/or generation of vibration, which are different from those exhibited by the interaction between the second member (4) and the second guide path.

22 Claims, 4 Drawing Sheets

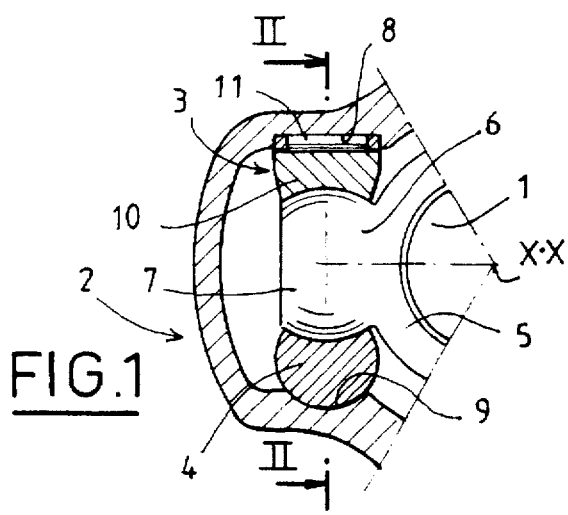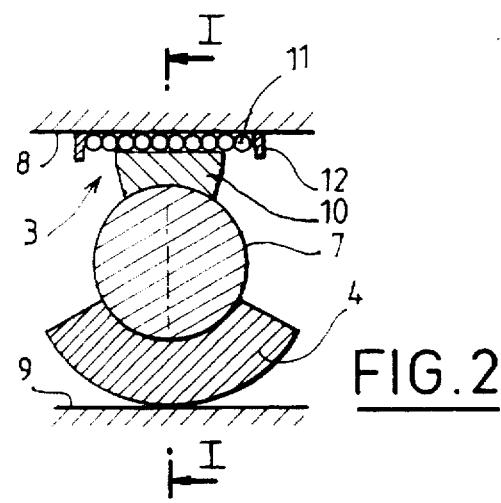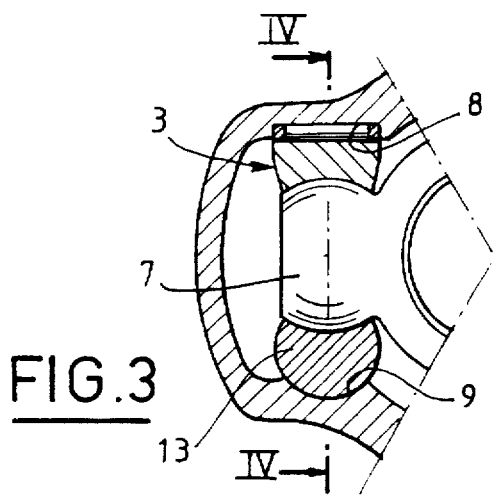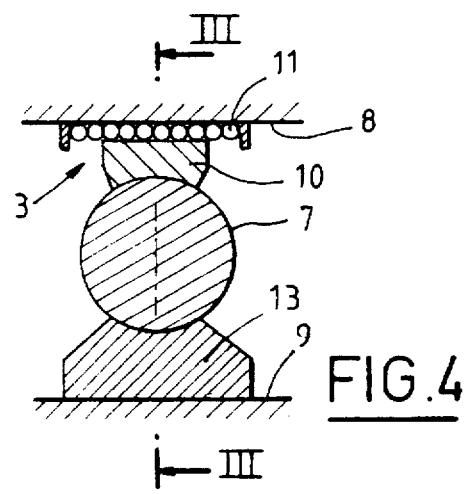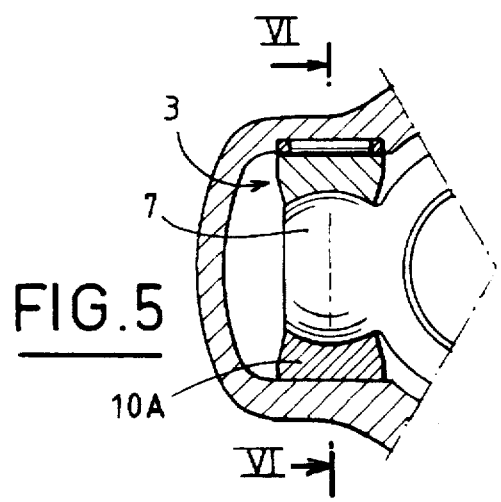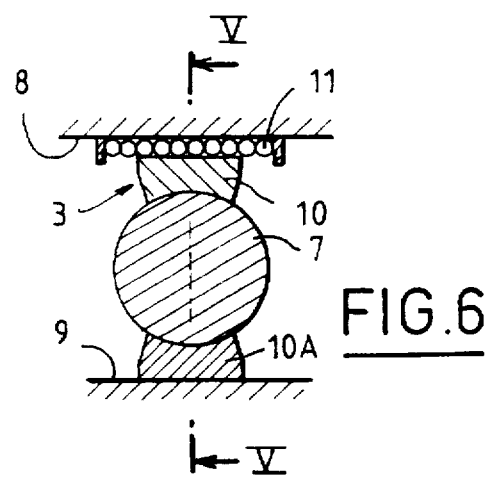

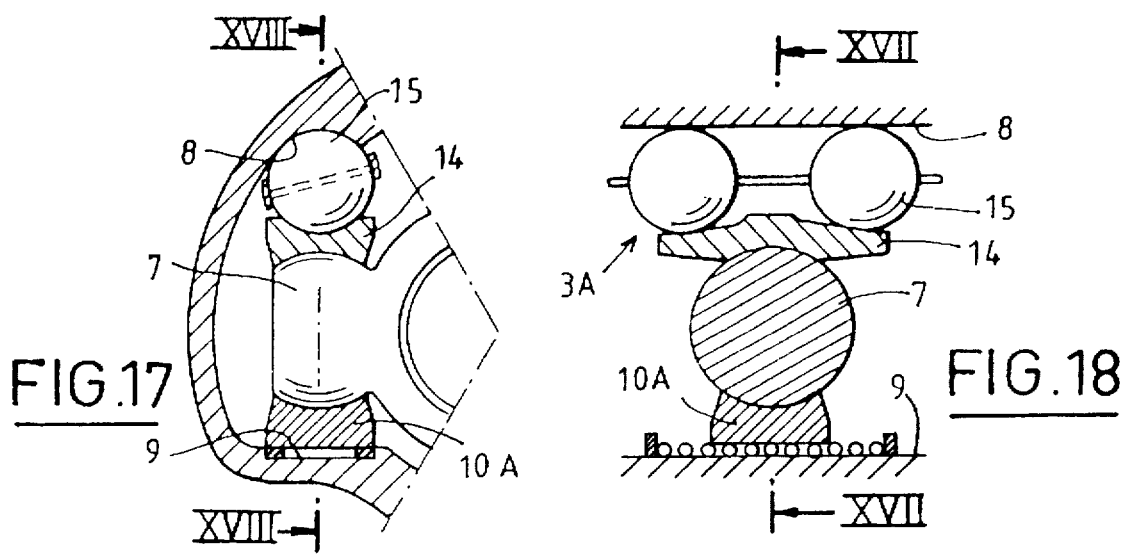

SLIDING UNIVERSAL JOINT FOR A MOTOR VEHICLE HAVING A TRIPOD WITH THREE JOURNALS EACH HAVING TWO DIFFERENT FORCE TRANSMISSION COMPONENTS

The present invention relates to a sliding universal joint of the type comprising: a male element intended to be fixed to a first shaft and including arms, each of which bears a ball-type journal which is integral therewith. A female element is intended to be fixed to a second shaft and defines two guide paths which are respectively situated on either side of each journal; and Intermediate members are interposed between each ball-type journal and the associated guide paths.

In known universal joints of this type, many attempts have been made to reduce the resistance to the free axial sliding under torque and at an angle, so as to prevent the transmission of vibration to the structure of the vehicle, and to reduce the creation of cyclic axial excitations under torque and at an angle. Effective solutions have been proposed, but at an expense involving an increase in the complexity and in the cost of the joints (see, for example, FR-A 2,506,872 and 2,628,803 in the name of the Applicant Company).

SUMMARY OF THE INVENTION

The object of the invention is to provide a sliding universal joint whose design, better suited to actual operating conditions, makes it possible, at a reduced cost, to obtain a similar result throughout virtually the entire lifetime of the joint.

To this end, the subject of the invention is a universal joint of the aforementioned type, characterized in that the intermediate members comprise a first member which interacts with a first of the guide paths and has properties, with respect to the transmission and/or generation of vibration, which are different from those exhibited by the interaction between the second member and the second guide path.

The universal joint according to the invention may include one or more of the following characteristics:

- the first guide path is plane, and the first intermediate member is a pad which is spherical on the inside, and of which the opposite face from the journal is plane and moves along the first guide path via a row of needles;

- the first guide path is cylindrical with circular cross-section, and the first intermediate member comprises on the one hand a strip, especially a self-recentering strip, which on the journal side has a spherical recess and on the opposite side has at least one track with circular cross-section and, on the other hand, at least two balls which run along this or these tracks and along the first guide path;

- the first guide path is cylindrical, and the first guide member is a torus sector on the outside which is spherical on the inside and which runs along this guide path;

- the second guide path is cylindrical, and the second intermediate member is a portion which is spherical on the inside and cylindrical on the outside to slide in this guide path;

- the second guide path is plane, and the second intermediate member is a pad which is spherical on the inside, and of which the opposite face from the journal is plane and slides directly along this guide path;

- the second guide path is cylindrical, and the second intermediate member is a torus sector on the outside which is spherical on the inside and which runs along this guide path;

- the second guide path is cylindrical with circular cross-section, and the second intermediate member comprises on the one hand a strip, especially a self-centering strip, which exhibits on the journal side a spherical recess and on the opposite side at least one track with circular cross-section and, on the other hand, at least two balls which run along this or these tracks and along the second guide path;

- the guide paths have a straight overall axis parallel to the axis of the female element;

- the male element is a tripot.

DESCRIPTION OF THE DRAWINGS

Embodiments of the invention will now be described with respect to the appended drawings, in which:

- FIG. 1 represents diagrammatically, in transverse section taken on the line I—I of FIG. 2, one third of a universal joint according to the invention;

- FIG. 2 is a view taken in section on line II—II of FIG. 1; and

- FIGS. 3 to 16 are similar views of other embodiments, FIGS. 3, 5, 7, 9, 11, 13 and 15 corresponding to FIG. 1 and being taken in section, respectively, on lines III—III, V—V, VII—VII, IX—IX, XI—XI, XIII—XIII and XV—XV of FIGS. 4, 6, 8, 10, 12, 14 and 16, whereas FIGS. 4,6,8,10, 12,14 and 16 are taken in section, respectively, on lines IV—IV, VI—VI, VIII—VIII, X—X, XII—XII, XIV—XIV and XVI—XVI of FIGS. 3, 5, 7, 9, 11, 13 and 15.

Figure 17 is a cross-sectional view taken along lines XVII of FIG. 18 and FIG. 18 is a cross-sectional view taken along lines XVIII of FIG. 17, these Figures being similar to FIGS. 1 and 2 and of a further embodiment according to the present invention.

DETAILED DESCRIPTION OF THE PREFERRED EMBODIMENTS

Figure 7:
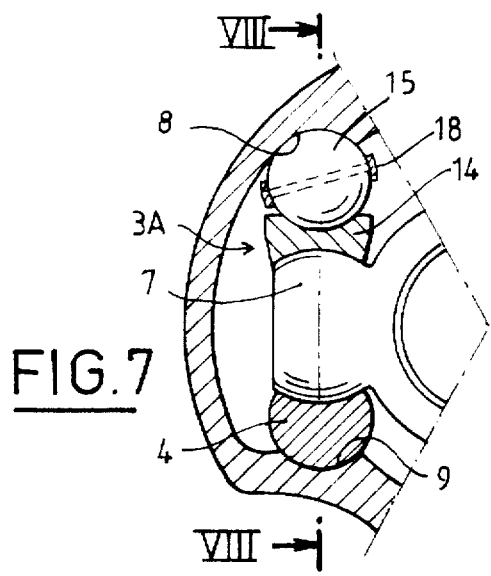
Figure 8:
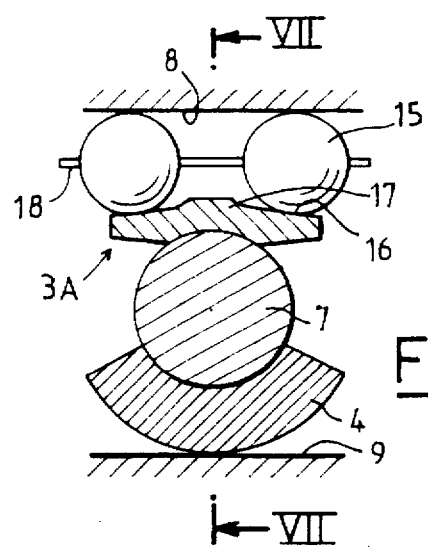
Figure 9:
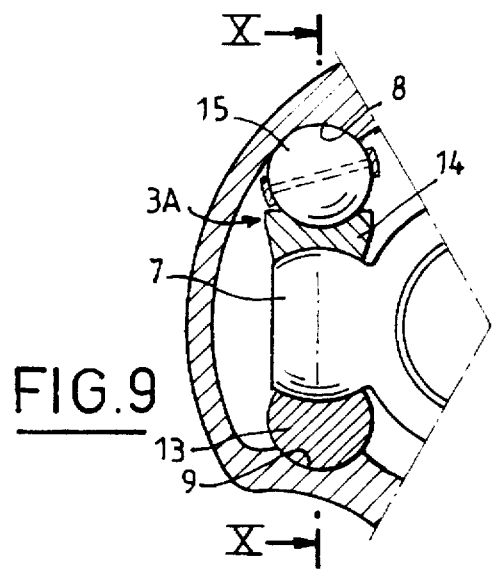
Figure 10:
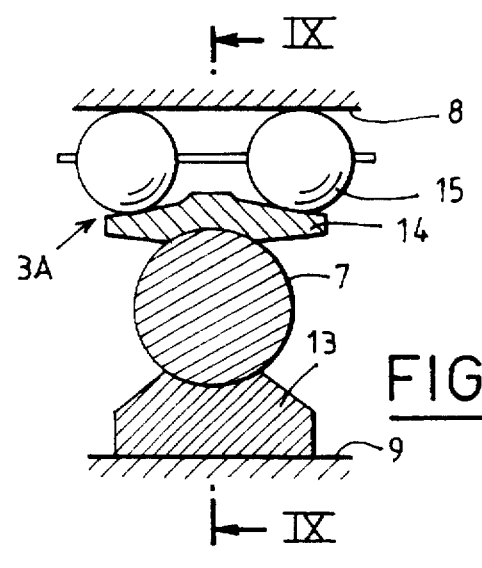
Figure 11:
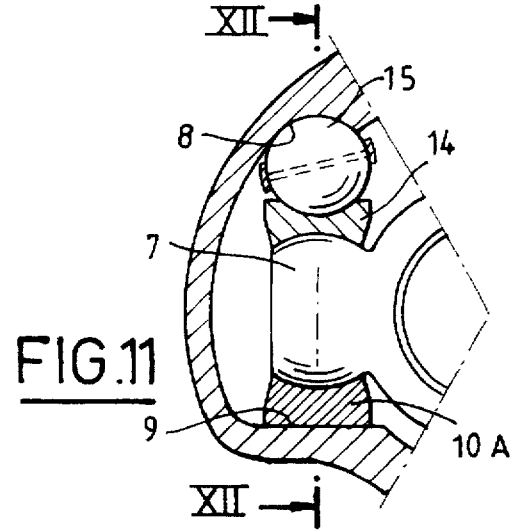
Figure 12:
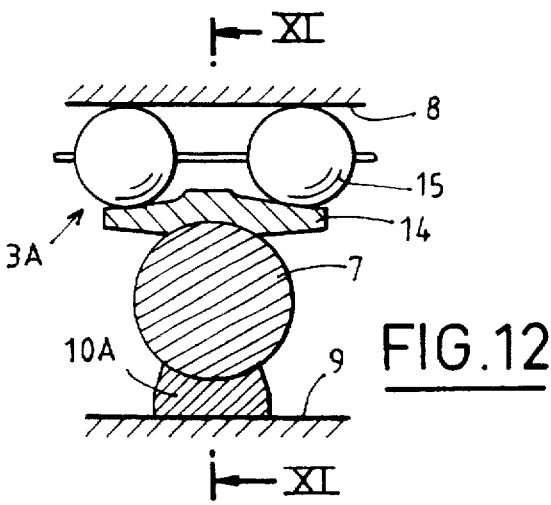

The universal joint represented in FIGS. 1 and 2 is intended to connect two shafts (not represented) which can slide with respect to each other, either in mutual alignment or at an angle of discontinuity which may typically reach approximately 25°. It essentially comprises a male element or tripod 1, a female element or jaw 2, three assemblies 3 with pad and needles, and three torus sectors 4.

The tripod is made as a single piece and comprises a central hub 5 designed to be secured to one of the two shafts, and from which three arms 6, spaced at angles of 120°, project radially. The radially outer part of each arm is shaped into a spherical journal 7.

The jaw 2 defines, for each arm 6, a pair of facing runway paths: a first runway path 8 consisting of a straight slot with a flat bottom, parallel to the axis X—X of the jaw, and a second runway path 9 consisting of a cylindrical slot with circular cross-section and an, of axis parallel to the axis X—X.

The assembly 3 comprises a pad 10 with a spherical internal face substantially matching the journal 7 and interacting with it, and with a plane external face moving along the bottom of the slot 8 with interposition of a row of needles 11 which are perpendicular to the axis X—X, and retained by a cage 12. The assembly 3, which is described, for example, in the aforementioned FR-A-2,506,872, has very low resistance to running, especially under torque and at an angle.

The torus sector 4 includes a spherical internal face substantially matching the journal 7 and interacting with it, and a toric external face substantially matching the runway path 9 and interacting with it. In this way, the sector 4 runs along this path 9, but with a resistance to running which is obviously greater than that of the assembly 3. In contrast, the sector 4 is markedly simpler and less expensive than the assembly 3 and, in addition, it is easier and more economical to machine the cylindrical runway path 9 than the plane runway path 8.

In service, the joint is mounted in a motor-vehicle transmission in such a manner that, in a forwards gear, the engine torque is transmitted from the tripod to the jaw via the three assemblies 3. Under torque, a slight clearance arises on the sectors 4 side, so that the resistance to sliding is practically that defined by the assemblies 3 and is therefore very low, even at an angle. In other words, in a forwards gear, that is to say almost all of the operating life of the joint, the level of axial excitations transmitted by the joint to the structure of the vehicle is particularly low.

In reverse gear, it is the resistance to running of the sector 4 which defines the resistance to sliding of the joint. This resistance is greater than that corresponding to a forwards gear, but is acceptable given the very short time for which the vehicle operates in reverse gear.

In the joint of FIGS. 3 and 4, the assembly 3 is the same as in FIGS. 1 and 2, but the torus sector 4 is replaced by a portion 13 which is cylindrical on the outside, substantially matching the cylindrical runway path 9 and interacting with it, and spherical on the inside, substantially matching the journal 7 and interacting with it. In this way, during axial sliding of the joint, the portion 13 slides in the path 9, consequently offering a resistance to sliding which is greater than that displayed by the torus sector 4 of FIGS. 1 and 2.

The joint of FIGS. 5 and 6 again includes the aforementioned assembly 3, whereas the guide path 9 is plane and the associated intermediate member is a pad 10A similar to the pad 10 but sliding directly along this guide path.

The universal joints of FIGS. 7–8, 9–10 and 11–12 are identical, respectively, to those of FIGS. 1–2, 3–4 and 5–6, with just two differences.

On the one hand, the slot 8 is cylindrical, with circular cross-section, the axis of which is parallel to the axis X—X, and the external shape of the jaw 2 is modified correspondingly. On the other hand, the assembly 3 is replaced by an assembly 3A consisting of a self-recentering strip 14 and two balls 15. The strip 14 internally includes a spherical recess substantially matching the journal and interacting with it, and externally includes two runway tracks 16 with circular cross-section which are separated by a middle projection 17. The tracks 16, viewed in plan, are the extension of one another; in lateral view (FIG. 8), they diverge progressively from the path 8 starting from the projection 17. Each ball 15 is interposed between one of these tracks and the runway path 8, and the shape of the two tracks ensures self-recentering of the two balls, as described in the aforementioned FR-A-2,628,803. The assembly 3A is supplemented by a cage 18 for retaining the balls.

The assembly 3A exhibits a resistance to running which is approximately as low as the assembly 3 of FIGS. 1 to 5, so that the comments made above on the subject of these figures again apply.

FIGS. 13 to 16 represent universal joints in which the forwards gear side part, with low resistance to running, is identical to the reverse gear side part of FIGS. 1–2 and 7–8, that is to say comprises a torus sector 4 which runs in a cylindrical runway path 8.

Figure 13:
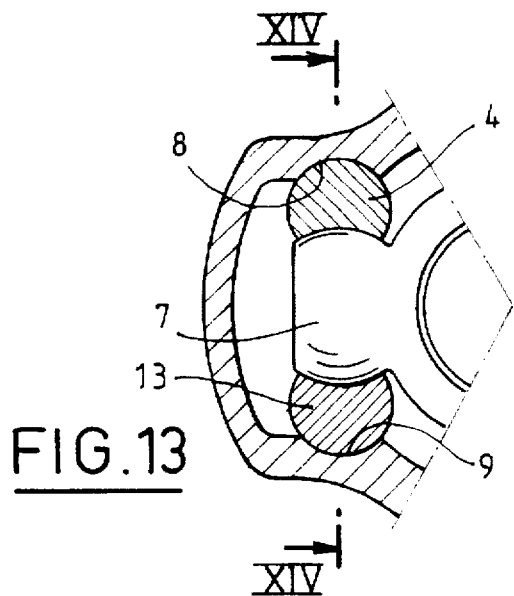
Figure 14:
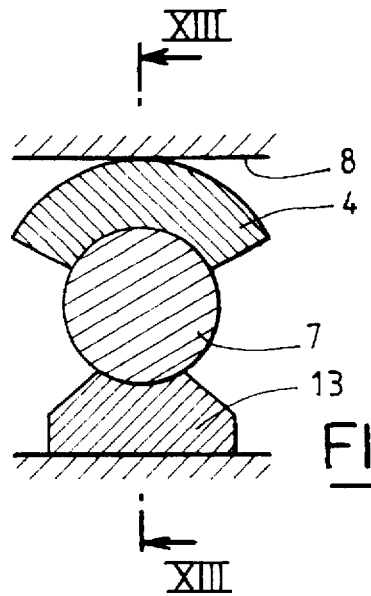

In the case of FIGS. 13–14, the reverse gear side part of the joint is identical to that of FIGS. 3–4 and 9–16 (externally cylindrical portion 13).

Figure 15:
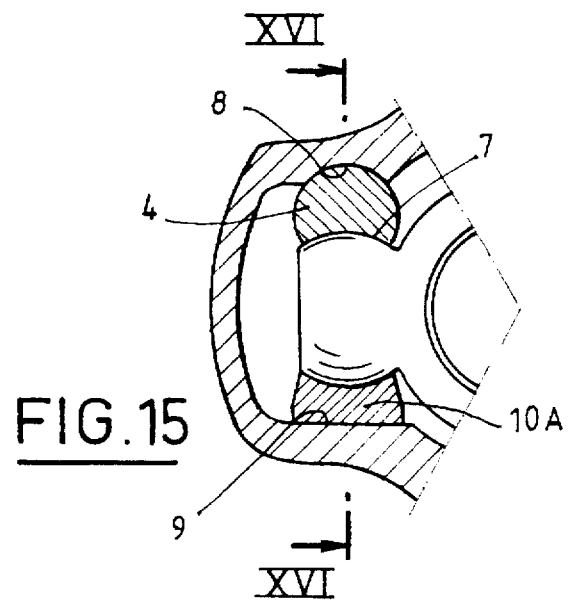
Figure 16:
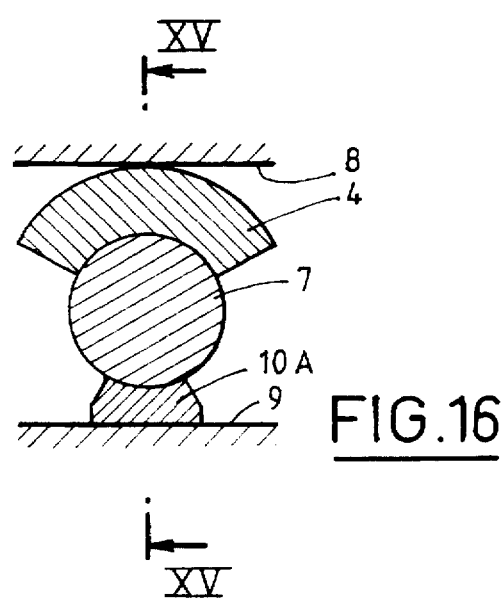

In the case of FIGS. 15–16, it is identical to that of FIGS. 5–6 and 11–12 (externally plane pad 10A sliding directly along a plane guide path 9).

Another alternative shown in FIGS. 17 and 18 consists in combining a pad 10A/needles 11/cage 12 assembly on one side of the journal 7, and a strip 14/balls 15/cage 18 assembly on the other side of this journal.

From the above description it can be seen that in each embodiment the first and second intermediate members have different configurations. That is, they are structured differently. As a result, intermediate members 3 and 4 exhibit different properties in interaction with their respective guide paths 8 and 9 with respect to at least one of vibration transmission and vibration generation. Indeed, it can be seen that a number of embodiments involving a roller element for one intermediate member results in one of the intermediate members having a smaller amount of resistance to free axially sliding than the other of the intermediate members when the respective intermediate members are in contact with their respective guide paths.

We claim:

1. A sliding universal joint, comprising:

a male element intended to be fixed to a first shaft, said male element comprising arms, and each of said arms comprising a spherical journal member integral therewith;

a female element intended to be fixed to a second shaft and engaged with said male element, said female element defining a plurality of guide paths such that two of said guide paths are situated on opposite sides of each said spherical journal member; and intermediate members interposed between each said spherical journal member and the two of said guide paths situated on opposite sides thereof, the two of said guide paths including a first guide path and a second guide path;

wherein said intermediate members comprise, for each said spherical journal member, a first intermediate member that is adapted to interact with the first guide path and a second intermediate member that is adapted to interact with the second guide path; and wherein said first intermediate member has a smaller amount of resistance to free axial sliding when said first intermediate member contacts and interacts with said first guide path than the amount of resistance to free axial sliding of said second intermediate member when said second intermediate member contacts and interacts with said second guide path.

2. The sliding universal joint of claim 1, wherein:

each said spherical journal member comprises a forward rotation direction side and a rearward rotation direction side, each said forward rotation direction side facing in the same forward rotational direction and each said rearward rotation direction side facing in the same rearward rotational direction opposite to the forward rotation direction, the two of said guide paths, for each said spherical journal member, comprising said first guide path facing said forward rotation direction side and said second guide path facing said rearward rotation direction side; and wherein said first and second intermediate members are interposed between each said spherical journal member and the respective said first and second guide paths so as to be capable of transmitting force between each said forward rotation direction side of each said spherical journal member and each of said first guide paths during forward rotation and between each said rearward rotation direction side of each said spherical journal member and each of said second guide paths during rearward rotation.

3. A sliding universal joint, comprising:

a male element intended to be fixed to a first shaft, said male element comprising arms, and each of said arms comprising a spherical journal member integral therewith;

a female element intended to be fixed to a second shaft and engaged with said male element, said female element defining a plurality of guide paths such that two of said guide paths are situated on opposite sides of each said spherical journal member; and intermediate members interposed between each said spherical journal member and the two of said guide paths situated on opposite sides thereof, the two of said guide paths including a first guide path and a second guide path;

wherein said intermediate members comprise, for each said spherical journal member, a first intermediate member that is adapted to interact with the first guide path and a second intermediate member that is adapted to interact with the second guide path; and wherein said first intermediate member has a different configuration than said second intermediate member such that said first intermediate member has properties in interaction with the first guide path with respect to at least one of vibration transmission and vibration generation that are different than properties of said second member in interaction with the second guide path with respect to at least one of vibration transmission and vibration generation.

4. The sliding universal joint of claim 3, wherein:

each said spherical journal member comprises a forward rotation direction side and a rearward rotation direction side, each said forward rotation direction side facing in the same forward rotational direction and each said rearward rotation direction side facing in the same rearward rotational direction opposite to the forward rotation direction, the two of said guide paths, for each said spherical journal member, comprising said first guide path facing said forward rotation direction side and said second guide path facing said rearward rotation direction side; and wherein said first and second intermediate members are interposed between each said spherical journal member and the respective said first and second guide paths so as to be capable of transmitting force between each said forward rotation direction side of each said spherical journal member and each of said first guide paths during forward rotation and between each said rearward rotation direction side of each said spherical journal member and each of said second guide paths during rearward rotation.

5. A sliding universal joint, comprising:

a male element intended to be fixed to a first shaft, said male element comprising arms, and each of said arms comprising a spherical journal member integral therewith;

a female element intended to be fixed to a second shaft and engaged with said male element, said female element defining a plurality of guide paths such that two of said guide paths are situated on opposite sides of each said spherical journal member; and intermediate members interposed between each said spherical journal member and the two of said guide paths situated on opposite sides thereof, the two of said guide paths including a first guide path and a second guide path;

wherein said intermediate members comprise, for each said spherical journal member, a first intermediate member that is adapted to interact with the first guide path and a second intermediate member that is adapted to interact with the second guide path; and wherein said first intermediate member has properties in interaction with said first guide path with respect to at least one of vibration transmission and vibration generation that are different in quantity than properties of said second member in interaction with the second guide path with respect to at least one of vibration transmission and vibration generation, such that when said first intermediate member interacts with said first guide path a different amount of vibration is generated or transmitted thereby than when said second intermediate member interacts with said second guide path.

6. The sliding universal joint of claim 5, wherein said first guide path is plane and said first intermediate member comprises a pad having an inner spherical surface in engagement with said spherical journal member and a face opposite to said spherical journal that is plane and movable along said first guide path, said first guide path and said face opposite to said spherical journal having a row of needle bearings therebetween.

7. The universal joint of claim 6, wherein said second guide path is cylindrical and said second intermediate member comprises a spherical inner surface for engagement with said spherical journal and a cylindrical outer surface for slidable engagement with said second guide path.

8. The universal joint of claim 6, wherein said second guide path is plane and said second intermediate member comprises a spherical inner surface for engagement with said spherical journal and a face opposite to said spherical journal that is plane and in direct slidable engagement with said second guide path.

9. The universal joint member of claim 6, wherein said second guide path is cylindrical and said second intermediate member comprises a sector movable along said second guide path having a toric outer surface for engagement with said second guide path and a spherical inner surface for engagement with said spherical journal.

10. The sliding universal joint of claim 6, wherein said second guide path is cylindrical and has a partly circular cross-section and wherein said second intermediate member comprises a self re-centering strip having a spherical recess on an inner side thereof for engagement with said spherical journal, at least one track on a side thereof opposite to said spherical recess having a partly circular cross-section, and at least two balls in said at least one track for engagement with said second guide path.

11. The sliding universal joint of claim 5, wherein said first guide path is cylindrical and has a partly circular cross-section and wherein said first intermediate member comprises a self re-centering strip having a spherical recess on an inner side thereof for engagement with said spherical journal, at least one track on a side thereof opposite to said spherical recess having a partly circular cross-section, and at least two balls in said at least one track for engagement with said first guide path.

12. The universal joint member of claim 11, wherein said second guide path is cylindrical and said second intermediate member comprises a sector movable along said second guide path having a toric outer surface for engagement with said second guide path and a spherical inner surface for engagement with said spherical journal.

13. The universal joint of claim 11, wherein said second guide path is cylindrical and said second intermediate member comprises a spherical inner surface for engagement with said spherical journal and a cylindrical outer surface for slidable engagement with said second guide path.

14. The universal joint of claim 11, wherein said second guide path is plane and said second intermediate member comprises a spherical inner surface for engagement with said spherical journal and a face opposite to said spherical journal that is plane and in direct slidable engagement with said second guide path.

15. The sliding universal joint of claim 5, wherein said first guide path is cylindrical and wherein said first intermediate member comprises a sector movable along said first guide path having a toric outer surface for engagement with said first guide path and a spherical inner surface for engagement with said spherical journal.

16. The universal joint member of claim 15, wherein said second guide path is cylindrical and said second intermediate member comprises a sector movable along said second guide path having a toric outer surface for engagement with said second guide path and a spherical inner surface for engagement with said spherical journal.

17. The sliding universal joint of claim 15, wherein said second guide path is plane and said second intermediate member comprises a spherical inner surface for engagement with said spherical journal and a face opposite to said spherical journal that is plane and in direct slidable engagement with said second guide path.

18. The sliding universal joint of claim 5, wherein:

each said spherical journal member comprises a forward rotation direction side and a rearward rotation direction side, each said forward rotation direction side facing in the same forward rotational direction and each said rearward rotation direction side facing in the same rearward rotational direction opposite to the forward rotation direction, the two of said guide paths, for each said spherical journal member, comprising said first guide path facing said forward rotation direction side and said second guide path facing said rearward rotation direction side; and wherein said first and second intermediate members are interposed between each said spherical journal member and the respective said first and second guide paths so as to be capable of transmitting force between each said forward rotation direction side of each said spherical journal member and each of said first guide paths during forward rotation and between each said rearward rotation direction side of each said spherical journal member and each of said second guide paths during rearward rotation.

19. The sliding universal joint of claim 5, wherein said first intermediate member comprises a rolling structure, said first and second intermediate members having different configurations.

20. The sliding universal joint of claim 19, wherein said first intermediate member comprises a toric sector and said second intermediate member comprises a sliding member having a plane contact surface for engagement with said second guide path.

21. The sliding universal joint of claim 19, wherein said first intermediate member comprises a plurality of roller elements between an engaging member engaging said spherical journal and said first guide path.

22. The sliding universal joint of claim 21, wherein said second intermediate member consists of a single unitary member having an inner spherical journal contact surface and an outer second guide path contact surface.

* * * * *